United States Patent [19]
Eason et al.

[11] Patent Number: 5,265,156
[45] Date of Patent: Nov. 23, 1993

[54] DIGITAL SIGNAL CROSS-CONNECT PANEL

[75] Inventors: John C. Eason, Seatac; Thomas J. Kunst, Seattle; Gary J. Gunell, Woodinville, all of Wash.

[73] Assignee: Augat Communication Products Inc., Kent, Wash.

[21] Appl. No.: 748,043

[22] Filed: Aug. 21, 1991

[51] Int. Cl.$^5$ .............................. H04M 5/02
[52] U.S. Cl. .................... 379/327; 370/58.3; 370/67
[58] Field of Search ............ 370/58.1, 58.2, 58.3, 370/67; 361/331, 426, 428; 379/327, 270, 271, 272

[56] References Cited

U.S. PATENT DOCUMENTS

| | | | |
|---|---|---|---|
| 4,670,626 | 6/1987 | Fisher et al. | 379/326 |
| 4,807,280 | 2/1989 | Posner et al. | 379/272 |
| 4,845,736 | 7/1989 | Posner et al. | 379/272 |

Primary Examiner—James L. Dwyer
Assistant Examiner—Ahmad F. Matar
Attorney, Agent, or Firm—Weingarten, Schurgin, Gagnebin & Hayes

[57] ABSTRACT

A telecommunications digital signal cross-connect panel for interfacing multiplexer equipment having as many as 84 circuits and digital loop carrier equipment having at least 84 circuits. The panel includes 84 multiplexer ports, 84 carrier ports, 84 multiplexer cross-connect ports, and 84 carrier cross-connect ports. The panel also includes edge connector sockets which are each electrically connected to a corresponding one of the multiplexer cross-connect ports and a corresponding one of the multiplexer ports. The panel includes two edge connector cards which are each selectively insertable by the user into individual ones of the 84 edge connector sockets. Each of the edge connector cards is connected by a cable to a set of test access sockets. When an edge connector card is inserted into a selected edge connector socket, two sets of contacts of the selected edge connector socket move out of electrical connection with each other and move into electrical contact with the corresponding contacts of the inserted edge connector card. The edge connector sockets are "make before break" sockets which make contact with the card contacts before the two sets of socket contacts break contact.

22 Claims, 4 Drawing Sheets

DIGITAL SIGNAL CROSS-CONNECT PANEL

TECHNICAL FIELD

The present invention relates generally to a telecommunications cross-connect panel and, more particularly, to a digital signal cross-connect panel used in a digital telecommunications facility for interfacing various digital multiplex and carrier equipment and providing test access ports for serial and bridged access testing.

BACKGROUND OF THE INVENTION

A digital signal cross-connect panel is typically used by a telephone central office to passively cross-connect digital telecommunication equipment, such as a fiber multiplex having fiber multiplexer (MUX) circuits and a digital loop carrier having digital loop carrier circuitry. Such panels are typically known as digital signal cross-connect panels (or DSX panels), and provide a means for terminating the input and output circuits of digital telecommunication equipment to be interconnected. A conventional DSX panel has a portion for terminating the input and output circuits of the digital equipment to be interconnected, a portion for selective cross-connection of the input and output circuits of the digital equipment and a test access jack for each of the input circuits and for each of the output circuits of the digital equipment. The digital telecommunication equipment with which a DSX panel is currently used operates at the DS1 line rate of 1.544 mbs (T1/T1C line rates). DSX panels are usually configured to terminate the number of circuits matching the number of circuits used by the digital equipment to be interconnected. For example, if a single DSX panel is to be used with a typical digital fiber multiplexer having 28 multiplexer (MUX) circuits to be cross-connected to a typical digital loop carrier having 28 digital loop carrier (DS1) circuits, the DSX panel would require 56 available termination ports. The DSX panel would have 28 multiplexer termination ports to which the 28 multiplexer circuits would be connected and 28 carrier ports to which the 28 digital loop carrier circuits would be connected. Alternatively, 28 termination ports could be provided by one DSX panel and 28 termination ports by a second DSX panel if two panels were used. It is noted that each of the multiplexer circuits and each of the digital loop carrier circuits includes an input tip and ring circuit and an output tip and ring circuit, and thus each has four wires which must be terminated on the DSX panel. The DSX panel multiplexer and carrier termination ports each typically comprise four terminals, such as four wire wrap posts about which the four wires of a multiplexer or digital loop carrier circuit are wrapped.

The cross-connect portion of the DSX panel provides a means to make desired semi-permanent cross-connections between the multiplexer circuits and the digital loop carrier circuits of the digital equipment to be interconnected by the panel. For the example DSX panel referred to above, the cross-connect portion would have 28 multiplexer cross-connect ports and 28 carrier cross-connect ports, each having four terminals, such as four wire wrap posts. In conventional fashion, a selected one of the multiplexer circuits is interconnected to a selected one of the digital loop carrier circuits by hard-wiring together the corresponding multiplexer cross-connect port and the corresponding carrier cross-connect port. This is accomplished by making a hard-wire connection between an output tip terminal of the multiplexer cross-connect port and an input tip terminal of carrier cross-connect port, making a hard-wire connection between an output ring terminal of the multiplexer cross-connect port and an input ring terminal of the carrier cross-connect port, making a hard-wire connection between an output tip terminal of the carrier cross-connect port and an input tip terminal of the multiplexer cross-connect port, and making a hard-wire connection between an output ring terminal of the carrier cross-connect port and an input ring terminal of the multiplexer cross-connect port.

The multiplexer cross-connect ports and the corresponding multiplexer termination ports are electrically connected together internal of the DSX panel, and the carrier cross-connect ports and the corresponding carrier termination ports provided are electrically connected together internal of the DSX panel. These connections usually incorporate test access jacks, as will be described below.

After digital equipment is interconnected using a DSX panel, it is sometimes necessary to access and test the circuits of the multiplexer and digital loop carrier equipment. To do this, a conventional DSX panel has a set of test access jacks for each multiplexer termination port and a set of test access jacks for each carrier termination port. In other words, a DSX panel which interconnects 28 multiplexer circuits with 28 digital loop carrier circuits has a total of 56 sets of test access jacks. A set of test access jacks for a particular multiplexer or carrier termination port permits serial and bridged access to the input and output multiplexer or digital loop carrier circuits connected to the termination port.

Typically, a set of test access jacks comprises three Bantam jacks identified as an output jack, an input jack and a monitor jack. The output and input jacks each have a tip contact and a ring contact, and each of the tip and ring contacts has a spring arm contact which is in electrical contact therewith when no test plug is plugged into the jack and out of electrical contact therewith when a test plug is plugged into the jack. The electrical connections between the multiplexer and carrier termination ports and the corresponding multiplexer and carrier cross-connect ports are usually made through the output and input jacks for the termination ports.

In particular, the terminals of each multiplexer and carrier termination port are connected to the corresponding tip and ring contacts of the output and input jacks of the set of test access jacks for the termination port. The spring arm contacts for these tip and ring contacts are connected to the corresponding terminals of the corresponding multiplexer or carrier cross-connect port. In such fashion, when no test plug is inserted into the output or input jacks, a direct electrical path exists between the terminals of the termination port and the corresponding multiplexer or carrier cross-connect port. If a test plug is inserted into the output and input jacks for the termination port, the insertion causes both the spring arm contacts of each jack to break electrical contact with their corresponding tip and ring contacts and to disconnect the corresponding output and input terminals of the termination port from the corresponding output and input terminals of the corresponding multiplexer or carrier cross-connect port. Of course, this also connects the tip and ring contacts of the inserted test plugs through the tip and ring contacts of the output and input jacks to the corresponding termination port. Thus, the test plug provides serial access to the multiplexer or digital loop carrier circuit connected to the termination port for testing of the circuit or for temporary patching of the circuit to another circuit terminated on the DSX panel (other than the one connected on a semi-permanent basis through the existing hard-wire connection provided by the multiplexer and carrier cross-connect ports).

For example, when a patch cord is used with a test plug which is inserted into the output jack for a multiplexer termination port to which a multiplexer circuit is connected, the plug on the other end of the patch cord can be inserted into the input jack for a selected carrier termination port to which a digital loop carrier circuit is connected, other than the carrier termination port to which the multiplexer termination port is already connected through the hard-wiring of the corresponding cross-connect ports. This allows a user of the DSX panel to temporarily make a new connection between the multiplexer circuit and a different digital loop carrier circuit, and also temporarily bypass the digital loop carrier circuit to which connected through the cross-connect ports. Of course, to make a complete patch between digital equipment multiplexer and digital loop carrier circuits, two patch cords must be used, one to connect the output tip and ring circuit of the multiplexer circuit to the input tip and ring circuit of the digital loop carrier circuit, and the other to connect the input tip and ring circuit of the multiplexer circuit to the output tip and ring circuit of the digital loop carrier circuit.

In such manner, the first circuit of a multiplexer which is connected via the semi-permanent cross-connection provided by the cross-connect ports of the DSX panel to the first circuit of a digital loop carrier, can be temporarily disconnected from the first digital loop carrier circuit and connected to any one of the other digital loop carrier circuits using two patch cords. In like fashion, the first digital loop carrier circuit can be temporarily disconnected from the first multiplexer circuit and connected to any one of the other multiplexer circuits using two patch cords. This is useful when testing to determine if circuits are working correctly, and when making temporary connections while circuits are being repaired.

The third test access jack is the monitor jack. The monitor jack has its tip and ring contacts connected through resistors to the spring arm contacts of the output jack for the termination port. This provides a bridge access which is used to monitor for pulses or errors or patching or rolling in the multiplexer and digital loop carrier circuits which are connected together by the DSX panel. The monitor jack is connected so as to not disturb the circuits. Typically, resistor values are chosen which provide at least 20 dB of isolation from the working circuits.

While the prior art DSX panel just described functions well, it is desirable to reduce the cost of the panel and to also increase the circuit handling capacity of the panel. For a DSX panel that is six inches high and four inches in depth and designed to mount in an industry standard 23-inch equipment rack or cabinet with a WECo one-inch mounting hole, current DSX panels provide a maximum of about 64 termination ports. When using a single DSX panel, the panel can accommodate a telephone system which has a maximum of 32 multiplexer circuits and 32 digital loop carrier circuits. If the telephone system has more circuits, it is necessary to use two or more DSX panels, and hence take up greater space in the equipment rack where the DSX panels are mounted. It would be desirable to increase the current 64-port maximum density to at least 168 ports so that the DSX panel can interconnect as many as 84 multiplexer circuits and 84 digital loop carrier circuits. While it is desirable to increase the number of digital equipment circuits that can be handled by the DSX panel, it is necessary that the panel still have the ability to access and test each of the circuits connected to each termination port. The present invention fulfills these needs, and further provides other related advantages.

SUMMARY OF THE INVENTION

The present invention resides in a telecommunications digital signal cross-connect system for interfacing a first telecommunication unit having at least N telecommunication circuits, with each circuit including an input circuit and an output circuit, and a second telecommunication unit having at least N telecommunication circuits, with each circuit including an input circuit and an output circuit. N equals from at least 2 to at least 28. The system includes at least N first interface ports, with each first interface port including input and output terminals for connection of corresponding ones of the first telecommunication unit circuits thereto by a user of the panel. The system further includes at least N second interface ports, with each second interface port including input and output terminals for connection of corresponding ones of the second telecommunication unit circuits thereto by the user.

The system further includes at least N first cross-connect ports, with each first cross-connect port including input and output terminals, and at least N second cross-connect ports, with each second cross-connect port including input and output terminals. Each of the terminals of the second cross-connect ports are electrically connected to a corresponding one of the terminals of a corresponding one of the second interface ports. The first and second cross-connect ports allow the user to selectively cross-connect ones of the first cross-connect ports to ones of the second cross-connect ports, as desired, so as to interconnect the first telecommunication unit circuits with the second telecommunication unit circuits for normal telecommunication operation.

At least N panel connector members are also provided. Each of the panel connector members has first and second sets of contacts. Each of the contacts of the first set is electrically connected to a corresponding one of the terminals of a corresponding one of the first cross-connect ports, and each of the contacts of the second set is electrically connected to a corresponding one of the terminals of a corresponding one of the first interface ports. Corresponding ones of the first set of contacts and the second set of contacts are in electrical contact when in a first state, and out of electrical contact when in a second state.

The system has an input first test access connector member, an output first test access connector member, an input second test access connector member, and an output second test access connector which allow the user to selectively connect test access mating connector members thereto. Each of the first and second connector members has contacts.

The system further includes a movable connector member selectively connectable by the user to individual ones of the panel connector members. The movable connector member has first and second sets of contacts. When the movable connector member is connected to the selected panel connector member, the contacts of the first set of the movable connector member are positioned to be in electrical contact with corresponding ones of the contacts of the second set of the panel connector member, and the contacts of the second set of the movable connector member are positioned to be in electrical contact with the corresponding ones of the contacts of the second set of the panel connector member.

The first and second sets of contacts of the selected panel connector member move into the second state upon connection of the movable connector member to the selected panel connector member and move into the first state upon disconnection of the movable connector from the selected panel connector member. Each of the first set of contacts of the movable connector member is electrically connected through a cable to a corresponding one of the contacts of the output or input second connector members, and each of the second set of contacts of the movable connector member is electrically connected through the cable to a corresponding one of the contacts of the output or input first connector members.

In a preferred embodiment of the invention, the system includes at least two sets of test access connector members, and at least two movable connector members.

Also in the preferred embodiment of the invention, the output first connector member contacts and the input second connector member contacts are in electrical contact when no mating test connector member is connected to either of the output first connector member or the input second connector member, and are out of electrical contact when a mating test connector is connected to either of the output first connector member or the input second connector member. The input first connector member contacts and the output second connector member contacts are in electrical contact when no mating test connector member is connected to either of the input first connector member or the output second connector member, and are out of electrical contact when a mating test connector member is connected to either of the input first connector member or the output second connector member.

In the preferred embodiment, the first and second sets of contacts of the movable connector member make electrical contact with the first and second sets of contacts of the selected panel connector member upon connection of the movable connector member with the selected panel connector member before the selected panel connector member moves into the second state.

The system of the preferred embodiment is embodied in a panel utilizing an edge connector card as the movable connector member, and edge connector sockets as the panel connector members. The first and second sets of contacts for the edge connector card are located on opposite sides of the card. The first set of edge connector card contacts are positioned to be in electrical contact with the corresponding ones of the first set of edge connector socket contacts, and the second set of edge connector card contacts are positioned to be in electrical contact with corresponding ones of the second set of edge connector socket contacts when the card is inserted into the selected connector socket. Each set typically includes four contacts when the panel is designed to operate with multiplexer and digital loop carrier circuits, which each have four terminals. Each of the multiplexer and carrier circuits with which the panel is designed to operate typically include an input tip and ring circuit and an output tip and ring circuit.

Other features and advantages of the invention will become apparent from the following more detailed description, taken in conjunction with the accompanying drawings.

DETAILED DESCRIPTION OF THE INVENTION

Figure 1:
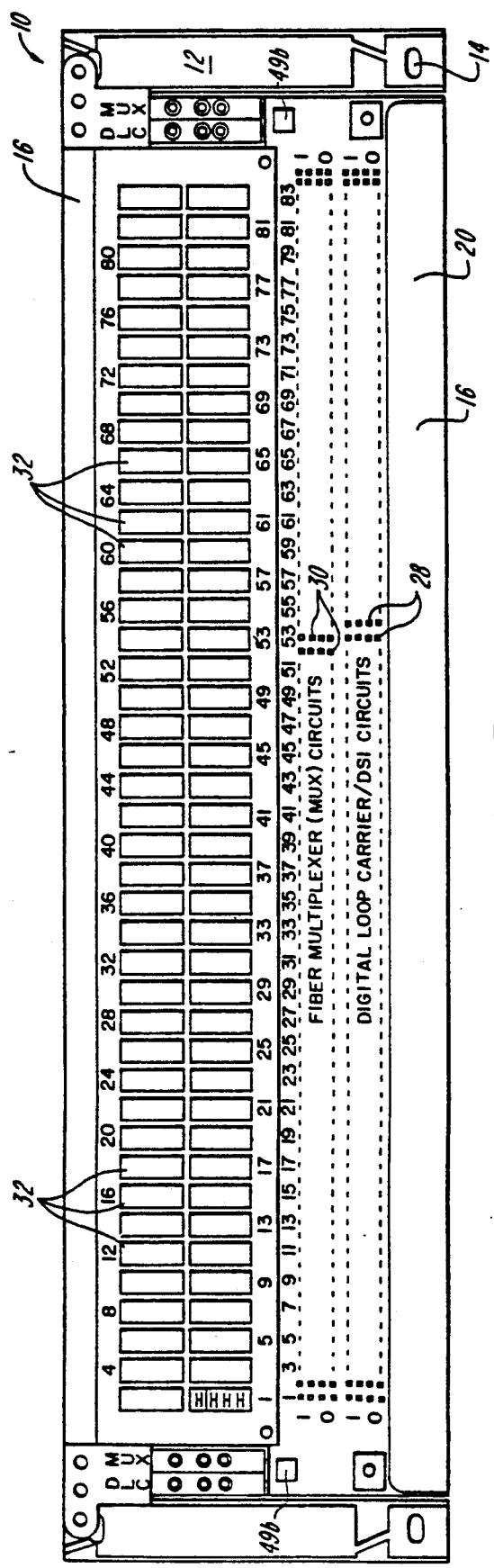
FIG. 1 is a front elevational view of a DSX panel embodying the, present invention.
Figure 2:
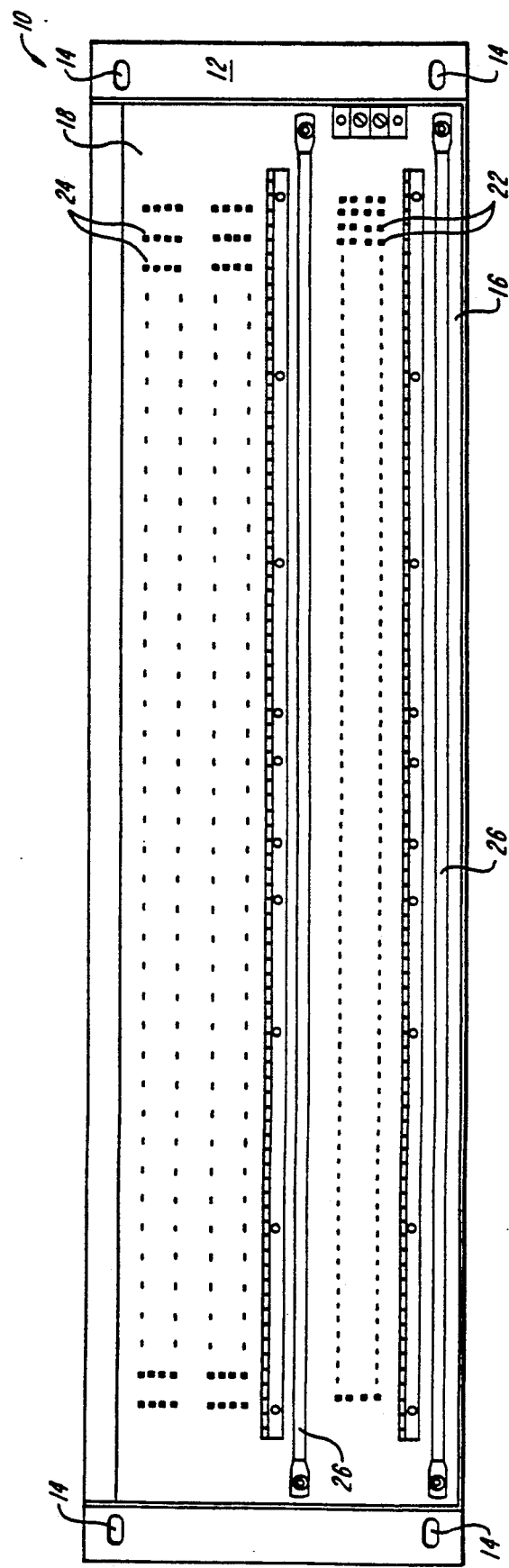
FIG. 2 is a rear elevational view of the DSX panel of FIG. 1.
Figure 3:
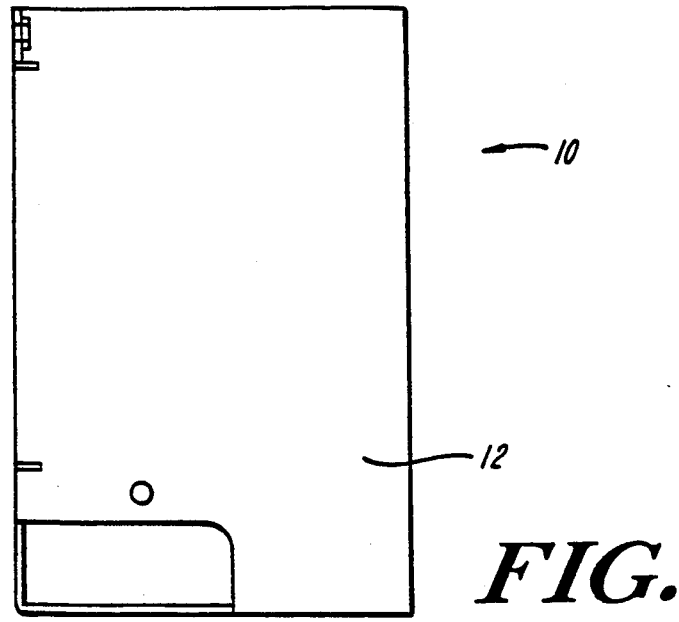
FIG. 3 is a right-side elevational view of the DSX panel of FIG. 1.

As shown in the drawings for purposes of illustration, the present invention is embodied in a digital signal cross-connect panel, commonly referred to as a DSX panel, indicated generally by reference numeral 10. The DSX panel shown in the drawings is designed for installation in an industry standard 23-inch equipment rack or cabinet with a WECO one-inch mounting hole pattern. The DSX panel 10 has a height of about 6 inches, a depth of about 4 inches, and a width of about 23.2 inches. The DSX panel 10 has a stationary mounting frame 12 with mounting holes 14 by which the panel is mounted to an equipment rack (not shown) by a plurality of fasteners (not shown). The DSX panel also includes a panel portion 16 which is pivotally connected to the stationary portion 12 to allow the panel portion to pivot forward about. 135° on its stationary mounting frame 12 to facilitate cabling of digital equipment to a rear face 18 (see FIG. 2) of the panel portion 16. The panel portion 16 also has a front face 20 (see FIG. 1) which is positioned toward the front opening of the equipment rack in which the DSX panel 10 is mounted.

The DSX panel 10 of the present invention is designed to terminate as many as 84 digital loop carrier circuits and 84 fiber multiplexer circuits, and provide for selective interconnection of the multiplexer and carrier circuits, and for serial and bridged access testing of the circuits while maintaining the size envelope of a standard DSX panel mountable in an industry standard 23-inch equipment rack.

The DSX panel 10 has 84 carrier ports 22 arranged in a single row on the rear face 18 of the panel portion 16 and numbered "1" through "84" (only the odd-numbered ports are actually labeled with their number). The 84 carrier rear ports 22 each comprise four terminals which include input tip and ring terminals and output tip and ring terminals for connection of the corresponding input tip and ring circuit and output tip and ring circuit of a digital loop carrier telecommunication unit (not shown) having 84 digital loop carrier circuits.

The DSX panel 10 also has 84 multiplexer ports 24 arranged in two rows on the rear face 18 of the panel portion 16, above the row of carrier rear ports 22, and numbered "1" through "84". It is noted that the carrier ports 22 and multiplexer ports 24 are labeled upside down so that when the panel portion 16 is pivoted forward the labels will be right side up when viewed by a user standing in front of the DSX panel. The 84 multiplexer rear ports 24 each comprise four terminals which include input tip and ring terminals and output tip and ring terminals for connection of the corresponding input tip and ring circuit and output tip and ring circuit of a fiber multiplexer telecommunication unit (not shown) having 84 multiplexer circuits.

Each of the carrier rear ports 22 and the multiplexer rear ports 24 comprise four wire wrap posts about which the four wires of the carrier circuit or multiplexer circuit to be terminated on the port are wrapped. In conventional fashion for each carrier rear port 22, the two wires of the input tip and ring carrier circuit are connected to the input tip and ring terminals of the carrier rear port and the two wires of the output tip and ring carrier circuit are connected to the output tip and ring terminals of the carrier rear port. Similarly, for each multiplexer rear port 24, the two wires of the input tip and ring multiplexer circuit are connected to the input tip and ring terminals of the multiplexer rear port and the two wires of the output tip and ring multiplexer circuit are connected to the output tip and ring terminals of the multiplexer rear port. As previously noted, the panel portion 16 pivots forward to facilitate wire wrapping of the terminals of the carrier rear ports 22 and multiplexer rear ports 24 from the front of the DSX panel 10 when the panel is installed in an equipment rack. In conventional fashion, the cables that extend from the digital loop carrier telecommunication unit and the multiplexer telecommunication unit to the DSX panel 10 for termination on the carrier rear ports 22 and the multiplexer rear ports 24 are supported by a pair of cable tie bars 26 firmly attached to the rear face 18 of the panel portion 16.

The DSX panel 10 has 84 carrier cross-connect ports 28 arranged in a single row on the front face 20 of the panel portion 16 and numbered "1" through "84" (only the odd-numbered ports are actually labeled with their number). Similarly, the DSX panel 10 has 84 multiplexer cross-connect ports 30 arranged in a single row on the front face 20 of the panel portion 16, above the row of carrier cross-connect ports 28, and numbered "1" through "84" (only the odd-numbered ports are actually labeled with their number). The 84 carrier cross-connect ports 28 and the 84 multiplexer cross-connect ports 30 each comprise four terminals which include input tip and ring terminals and output tip and ring terminals. The 84 carrier circuits of the digital loop carrier telecommunication unit and the 84 multiplexer circuits of the fiber multiplexer telecommunication unit are selectively interconnected for normal telephone system operation by the user making the desired cross-connections between the 84 carrier cross-connect ports 28 and the 84 multiplexer cross-connect ports 30. Each of the carrier cross-connect ports 28 and the multiplexer cross-connect ports 30 comprise four wire wrap posts about which four wires can be wrapped to make the desired interconnections between the carrier circuits and the multiplexer circuits on a semi-permanent basis.

The wire wrap posts which comprise the terminals of the carrier rear ports 22 extend fully through the panel portion 16 from the rear face 18 to the front face 20 and protrude from the front face to serve as the terminals of the carrier cross-connect ports 28, thus electrically connecting the 84 carrier circuits of the digital loop carrier telecommunication unit terminated on the carrier rear ports to the correspondingly numbered carrier cross-connect ports 30 on the front face.

Figure 4:
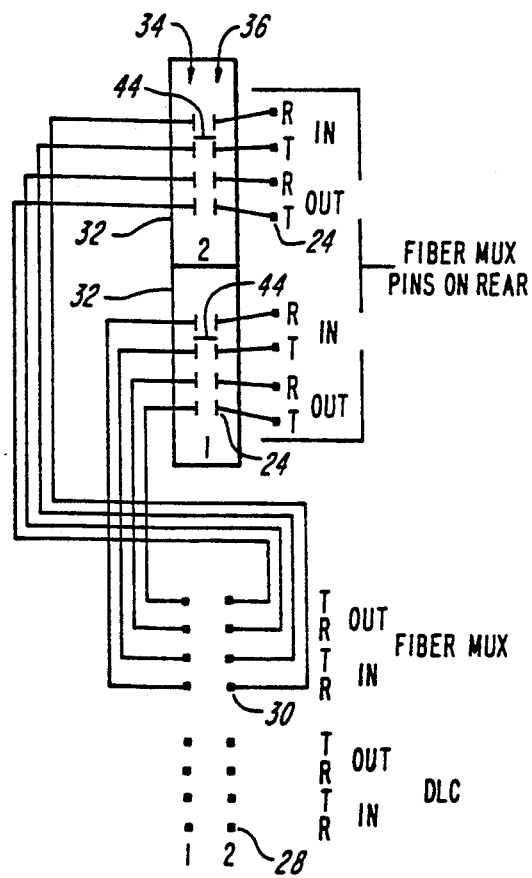
FIG. 4 is a schematic diagram showing the electrical interconnections of the first and second edge connector sockets with the corresponding multiplexer rear ports and multiplexer cross-connect ports for the DSX panel of FIG. 1.

Each of the 84 multiplexer rear ports 24 is electrically connected to the correspondingly numbered one of the 84 multiplexer cross-connect ports 30 on the front face 20 of the panel portion 16 through 84 edge connector sockets 32 arranged in two rows on the front face of the panel portion, above the row of multiplexer cross-connect ports 30, and numbered "1" through "84" (only some of the sockets are actually labeled with their number). Each of the edge connector sockets 32 has a first set of four contacts 34 and a second set of four contacts 36, as shown schematically in FIG. 4 for the two edge connector sockets labeled number "1" and number "2". The first set of four contacts 34 is electrically connected internal of the panel portion 16 to the corresponding four terminals of the corresponding numbered multiplexer cross-connect port 30. The second set of four contacts 36 is electrically connected internal of the panel portion 16 to the corresponding four terminals of the correspondingly numbered multiplexer rear port 24.

The edge connector sockets 32 are individually and removably mounted on a circuit board (not shown) which is positioned within the panel portion 16 and extends parallel with the rear and front faces 18 and 20 of the panel portion. The electrical connections between the socket contacts 34 and 36 and the terminals of the associated multiplexer rear and cross-connect ports 24 and 30 are made by way of traces on the circuit board. The wire wrap posts which comprise the terminals of the multiplexer cross-connect ports 30, the multiplexer rear ports 24, the carrier cross-connect ports 28 and the carrier rear ports 22, are all mounted on the circuit board.

The first and second sets of contacts 34 and 36 for each edge connector socket 32 comprise spring leaf contacts positioned opposite the other set so as to move into electrical contact when the socket is empty, referred to herein as the first state of the sockets, to provide an electrical connection between the input tip and ring terminals and the output tip and ring terminals of the correspondingly numbered multiplexer rear port 24 and the corresponding input tip and ring terminals and output tip and ring terminals of the correspondingly numbered multiplexer cross-connect port 30. When the sockets 32 are in the first state, the 84 multiplexer circuits of the multiplexer telecommunication unit terminated on the multiplexer rear ports 24 are electrically connected to the correspondingly numbered multiplexer cross-connect ports 30 on the front face 20 of the panel portion 16.

In a second state, achieved upon insertion of an edge connector card 38, which will be described in more detail below, the first and second sets of contacts 34 and 36 for the edge connector socket 32 within which the edge connector card is inserted are moved out of electrical contact with the other set. This electrically isolates the multiplexer circuit terminated on the multiplexer rear port 24 and the multiplexer cross-connect port 30 which are associated with the edge connector socket 32, except for whatever electrical interconnections are provided by the circuitry associated with the edge connector card 38.

The DSX panel 10 is provided with only two edge connector cards 38 which allow access to and testing of the 168 multiplexer and carrier circuits connected to the panel, as compared with prior art panels which utilized a set of test access jacks for each multiplexer port and each carrier termination port. For a prior art panel to terminate 84 carrier circuits and 84 multiplexer circuits, as does the illustrated embodiment of the DSX panel 10 of the present invention, 168 sets of test access jacks and associated circuitry would be required. That many jacks would not fit in a single standard-size panel.

Figure 5:
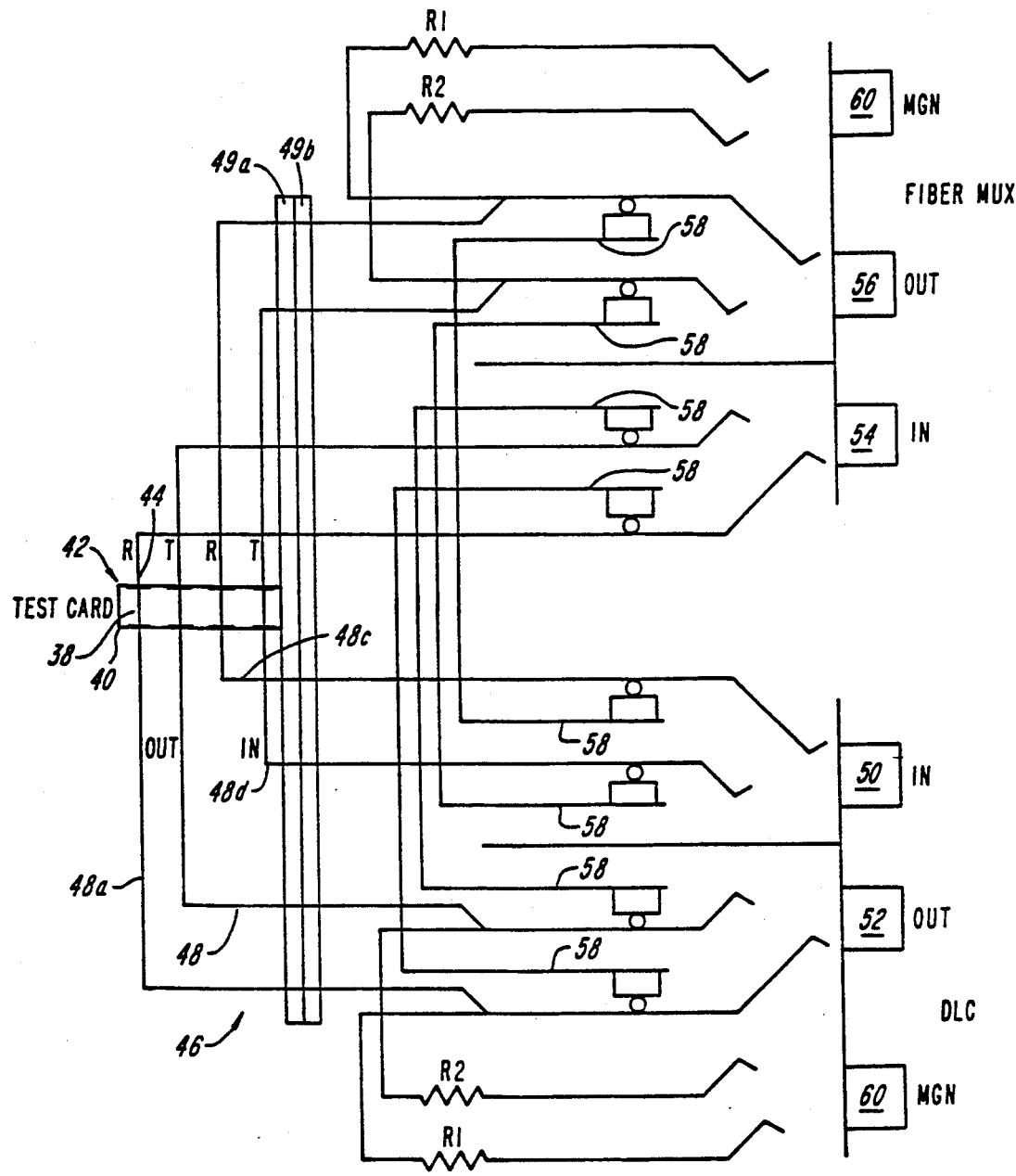
FIG. 5 is a schematic diagram showing the electrical interconnections of an edge connector card and associated the multiplexer and digital loop carrier test access jacks of the DSX panel of FIG. 1.

The two edge connector cards 38 used with the DSX panel 10 each has a first set of four contacts 40 and a second set of four contacts 42, as shown schematically in FIG. 5 for one of the two edge connector cards. The first and second sets of contacts 40 and 42 are positioned on opposite sides of the edge connector card 38 so that when the card is inserted into one of the 84 edge connector sockets 32, the first set of contacts 40 of the card make electrical contact with the first set of contacts 34 of the socket, and the second set of contacts 42 of the card make electrical contact with the second set of contacts 36 of the socket. To ensure proper alignment of the connector card 38 when inserted into one of the edge connector sockets 32, or polarized arrangement is used with each of the edge connector sockets and the edge connector cards having mating keys 44 that prevents insertion of the card if upside down.

The edge connector sockets 32 have "make before break" contacts which maintain the first and second sets of contacts 34 and 36 of the socket in their first state (i.e., in contact with each other) until after the edge connector card 38 is inserted sufficiently to place the first and second sets of contacts 40 and 42 of the card in electrical contact with the socket contacts. Only after the electrical contact is made between the card and socket contacts are the first and second sets of contacts 34 and 36 of the socket moved into their second state (i.e., out of contact with each other). As will be described in more detail below, in such manner the electrical interconnection of the multiplexer circuit and carrier circuit associated with a particular edge connection socket 32 is not broken merely by insertion of the edge connector card 38 therein.

When one of the edge connector cards 38 is fully inserted into a selected one of the 84 edge connector sockets 32, the first set of contacts 34 of the socket which are electrically connected to the correspondingly numbered multiplexer cross-connect port 30 are placed in electrical contact with the first set of contacts 40 of the card. Hence, each contact of the first set of card contacts 40 is electrically connected to a corresponding one of the input tip and ring terminals or output tip or ring terminals of the multiplexer cross-connect port 30. Similarly, the second set of contacts 36 of the selected edge connector socket 32 which are electrically connected to the correspondingly numbered multiplexer rear port 24 are placed in electrical contact with the second set of contacts 42 of the edge connector card 38. Hence, each contact of the second set of card contacts 42 is electrically connected to a corresponding one of the input tip or ring terminals or output tip or ring terminals of the multiplexer rear port 24.

The two edge connector cards 38 each have a flexible electrical cable 46, shown schematically in FIG. 5 as including eight wires 48a-h. The cable 46 for each edge connector card 38 has its end remote from the card terminated in an 8-pin modular plug 49a. The modular plug 49a is insertable into a mating modular socket 49b mounted on the front face 20 of the panel portion 16. Two modular sockets 49b are provided, one to the left side and one to the right side of the front face to accommodate the two edge connector cards 38, and each releasably locks the modular plug 49a inserted therein against unintended removal. This avoids accidentally disconnecting the cable 46 from the DSX panel 10 and then unintentionally interrupting the connection of the multiplexer and carrier circuits associated with the edge connector socket 32 upon insertion of the edge connector card 38 attached to the cable.

Each of the wires 48a-h of the cable 46 for one of the edge connector cards 38 is connected at one end to one of the contacts of the first and second sets of contacts 40 and 42 for the card. The other end of each wire is connected through the modular socket and plug 49a and 49b to one of two sets of four test access sockets, which will be described below. The two sets of test access sockets are mounted on the front face 20 of the panel portion 16. One set is to the left side of the front face and is connected to the left side modular jack 49b, and the other set is to the right side of the front face and is connected to the right side modular jack to accommodate the two edge connector cards 38.

In particular, the cable wires 48a, 48b, 48c and 48d, which are each connected to one of the contacts of the first set of the contacts 40 of the edge connector card 38, are each connected at the opposite end to a corresponding tip or ring contact of an input carrier test access socket 50 or an output carrier test access socket 52. Since the first set of contacts 40 of the edge connector card 38 are in electrical contact with the corresponding terminals of the multiplexer cross-connect port 30 associated with the selected edge connector socket 32 when the edge connector card is fully inserted into the selected edge connector socket, and those terminals are in electrical contact with the corresponding terminals of the associated carrier cross-connect port 28 through the semi-permanent cross-connections made by the user of the DSX panel 10, the tip and ring contacts of the input carrier socket 50 and the tip and ring contacts of the output carrier socket 52 are electrically connected through the carrier cross-connect port to the terminals of the carrier rear port 22, and hence the carrier circuit terminated thereon.

Similarly, the cable wires 48e, 48f, 48g and 48h, which are each connected to one of the contacts of the second set of contacts 42 of the edge connector card 38, are each connected at the opposite end to a corresponding tip or ring contact of an input multiplexer test access socket 54 or an output multiplexer test access socket 56. Since the second set of contacts 42 of the edge connector card 38 are in electrical contact with the corresponding terminals of the multiplexer rear port 24 associated with the selected edge connector socket 32 when the edge connector card is fully inserted into the selected edge connector socket, the tip and ring contacts of the input multiplexer socket 54 and the tip and ring contacts of the output multiplexer socket 56 are electrically connected to the terminals of the multiplexer rear port, and hence the multiplexer circuit terminated thereon.

Each of the tip and ring contacts of the input and output carrier sockets 50 and 52 and each of the tip and ring contacts of the input and output multiplexer sockets 54 and 56 has an associated spring arm contact 58 which is in electrical contact therewith when no test access plug is plugged into the socket. The spring arm contact 58 is moved out of electrical contact with the associated tip or ring contact when a test access plug (not shown) is plugged into the socket 50, 52, 54 and 56. As shown in FIG. 5, the spring arm contacts 58 associated with the tip and ring contacts of the input carrier socket 50 are connected to the spring arm contacts associated with the tip and ring contacts of the output multiplexer socket 56, respectively; and the spring arm contacts of the tip and ring contacts associated with the output carrier socket 52 are connected to the spring arm contacts associated with the tip and ring contacts of the input multiplexer socket 54, respectively. The interconnection of the spring arm contacts 58 are made by way of traces on the circuit board.

When no test access plug is inserted into any of the input or output carrier sockets 50 or 52 or the input or output multiplexer sockets 54 or 56, the spring arm contacts 58 provide a direct electrical path between the first and second sets of contacts 40 and 42 of the edge connector card 38, and hence between the first and second sets of contacts 34 and 36 of the selected edge connector socket 32 into which the card is fully inserted. The result is that the insertion of the edge connector card 38 into the selected edge connector socket 32 does not disturb the multiplexer or carrier circuits associated with the selected edge connector socket so long as no test access plugs are inserted into any of the input or output carrier or multiplexer sockets 50, 52, 54 or 56, and the cable modular plug 49a is inserted into the modular socket 49b for these sockets. If the modular plug and socket 49a and 49b are not connected together, an open circuit will result when the edge connector card 38 is inserted into the selected edge connector socket 32, and hence the existing interconnection of the associated multiplexer and carrier circuits will be interrupted.

When test access plugs are inserted into the input and output carrier sockets 50 and 52, those test access plugs are electrically connected through the first set of contacts 40 of the edge connector card 38 to the carrier circuit corresponding to the selected edge connector socket 32. Since upon insertion of the test access plugs into the input and output carrier sockets 50 and 52 the spring arm contacts 58 associated with the sockets break electrical contact with their corresponding spring arm contacts of the input and output multiplexer sockets 54 and 56, the inserted test access plugs are electrically disconnected from the multiplexer circuit corresponding to the selected edge connector socket. Similarly, when test access plugs are inserted into the input and output multiplexer sockets 54 and 56, those test access plugs are electrically connected through the second set of contacts 42 of the edge connector card 38 to the multiplexer circuit corresponding to the selected edge connector socket 32. Since upon insertion of the test access plugs into the input and output multiplexer sockets 54 and 56 the spring arm contacts 58 associated with the sockets break electrical contact with their corresponding spring arm contacts of the input and output carrier sockets 50 and 52, the inserted test access plugs are electrically disconnected from the carrier circuit corresponding to the selected edge connector socket.

The described circuitry provides the user with serial access to each of the multiplexer and carrier circuits terminated on the multiplexer rear port 24 and the carrier rear port 22 corresponding to the selected edge connector socket 32 for testing of the circuits or for temporary patching of the circuits to other multiplexer and carrier circuits terminated on the DSX panel 10. As noted above, the circuitry also isolates the one circuit from the circuit connected thereto on a semi-permanent basis through the existing hard-wire connection of the carrier and multiplexer cross-connect ports 28 and 30.

When using both of the two edge connector cards 38 of the DSX panel 10 inserted into two different selected edge connector sockets 32, a pair of patch cards (not shown), each having a test access plug at each end, can be used to gain access to the multiplexer circuit associated with one of the selected edge connector sockets and to gain access to the carrier circuit associated with the other selected edge connector socket, and thereby patch together the multiplexer circuit of one selected edge connector socket to the carrier circuit of the other selected edge connector socket on a temporary basis. The carrier circuit or multiplexer circuit to which connected on a semi-permanent basis through the hard-wire connection of the carrier and multiplexer cross-connect ports 28 and 30 are temporarily bypassed as a result of the spring arm contacts 58 of the input and output carrier and multiplexer sockets 50, 52, 54 and 56 into which the test access plugs are inserted breaking electrical contact with those circuits.

Each of the output carrier and multiplexer sockets 52 and 56 connected to each of the two edge connector cards 38 has a monitor socket 60 connected in parallel therewith. The tip and ring contacts of the monitor socket 60 are connected through resistors R1 and R2 to the spring arm contacts 58 of the output carrier or multiplexer socket 52 or 56 to provide isolation from the working carrier and multiplexer circuits while the circuits are being monitored.

The input and output carrier and multiplexer sockets 50, 52, 54 and 56, and the monitor socket 60 of both sets of test access sockets, are individually and removably mounted on the circuit board. As previously noted, the 84 edge connector sockets 32 are similarly mounted. With this arrangement, the sockets are each separately removable and replaceable by the user without interrupting operation of the other sockets or the multiplexer and carrier circuits associated with the other sockets. In the illustrated embodiment of the invention, the input and output carrier and multiplexer sockets 50, 52, 54 and 56 are Bantam jacks.

With the DSX panel 10 of the present invention, a high density digital signal cross-connect panel is provided with two sets of input and output carrier and multiplexer test access sockets. Each set of test access sockets can be used to test and access any one of the cross-connected 84 multiplexer and 84 carrier circuits without requiring a set of sockets for each circuit. Thereby, full test and access functions can be achieved for each of the 168 circuits terminated on the DSX panel 10 using a single standard sized panel. The reduced number of Bantam test jacks required and associated circuitry not only allows greater port density, but also results in a panel which is less expensive to manufacture. It is noted that the shared test access concept of the present invention used in the illustrated DSX panel 10 is applicable in situations where more than two sets of test access sockets are desired, without requiring one set of test jacks be used for each circuit. Furthermore, the shared test access concept can be used with the sets of test access sockets mounted on a separate panel from the panel on which the multiplexer and digital circuits are terminated.

The set of test access sockets associated with each of the two edge connector cards 38 are totally independent of any one of the 168 multiplexer and digital circuits until the edge connector card is plugged into one of the edge connector sockets 32. The edge connector card 38 can be inserted into a selected one of the 84 edge connector sockets 32, to access the multiplexer and digital circuits associated with the selected socket without disrupting the working circuits. Only when a test access plug is then inserted into the input or output carrier or multiplexer socket 50, 52, 54 or 56 is the working circuit disconnected from the circuit to which connected through the carrier and multiplexer cross-connect ports 28 and 30. When a circuit is accessed using the edge connector card, testing and patching together of circuits may be performed using industry standard Bantam patch cords and test equipment.

It will be appreciated that, although a specific embodiment of the invention has been described herein for purposes of illustration, various modifications may be made without departing from the spirit and scope of the invention. Accordingly, the invention is not to be limited except as by the appended claims.

We claim:

1. A telecommunications digital signal cross-connect panel for interfacing multiplexer equipment having at least N telecommunication circuits, each multiplexer circuit including an input tip and ring circuit and an output tip and ring circuit, and carrier equipment having at least N telecommunication circuits, each carrier circuit including an input tip and ring circuit and an output tip and ring circuit, where N equals at least 28, comprising:

at least N multiplexer rear ports mounted on a rear portion of the panel, each multiplexer rear port including input tip and ring terminals and output tip and ring terminals for connection of corresponding ones of the multiplexer equipment circuits thereto by a user of the panel;

at least N carrier rear ports mounted on said rear portion of the panel, each carrier rear port including input tip and ring terminals and output tip and ring terminals for connection of corresponding ones of the carrier equipment circuits thereto by the user;

at least N multiplexer cross-connect ports mounted on a front portion of the panel, each multiplexer cross-connect port including input tip and ring terminals and output tip and ring terminals, and at least N carrier cross-connect ports mounted on said front portion of the panel, each carrier cross-connect port including input tip and ring terminals and output tip and ring terminals to allow the user to selectively cross-connect ones of said multiplexer cross-connect ports to ones of said carrier cross-connect ports, as desired, so as to interconnect said multiplexer equipment circuits with said carrier equipment circuits for normal telecommunication operation, each of said four terminals of said carrier cross-connect ports being electrically connected internal of the panel to a corresponding one of said four terminals of a corresponding one of said carrier rear ports;

at least N edge connector sockets mounted on said front portion of the panel, each of said connector sockets having first and second sets of four contacts, each of said four contacts of said first set being electrically connected internal of the panel to a corresponding one of said four terminals of a corresponding one of said multiplexer cross-connect ports and each of said four contacts of said second set being electrically connected internal of the panel to a corresponding one of said four terminals of a corresponding one of said multiplexer rear ports, corresponding ones of said first set of four contacts and said second set of four contacts being in electrical contact when in a first state and being out of electrical contact when in a second state;

an input multiplexer test access socket, an output multiplexer test access socket, an input carrier test access socket and an output carrier test access socket mounted on said front portion of the panel which allow the user to selectively insert test access plugs therein, each socket having a tip contact and a ring contact, said tip and ring contacts of said output multiplexer socket and said tip and ring contacts of said input carrier socket, respectively, being in electrical contact when no test plug is inserted into either of said output multiplexer socket or said input carrier socket, and being out of electrical contact when a test plug is inserted into either of said output multiplexer socket or said input carrier socket, and said tip and ring contacts of said input multiplexer socket and said tip and ring contacts of said output carrier socket, respectively, being in electrical contact when no test plug is inserted into either of said input multiplexer socket or said output carrier socket, and being out of electrical contact when a test plug is inserted into either of said input multiplexer socket or said output carrier socket;

an edge connector card selectively insertable by the user into individual ones of said connector sockets, said connector card having first and second sets of four contacts, said first and second sets being located on opposite sides of said connector card with said four contacts of said first set of said connector card being positioned to be in electrical contact with corresponding ones of said four contacts of said first set of said connector socket and said four contacts of said second set of said connector card being positioned to be in electrical contact with corresponding ones of said four contacts of said second set of said connector socket when said connector card is inserted into said selected connector socket, said first and second sets of four contacts of said selected connector socket moving into said second state upon insertion of said connector card into said selected connector socket and moving into said first state upon withdrawal of said connector card from said selected connector socket, said first and second sets of four contacts of said connector card making electrical contact with said first and second sets of four contacts of said selected connector socket upon insertion of said connector card into said selected connector socket before said selected connector socket moves into said second state, each of said first set of four contacts of said connector card being electrically connected through a cable to a corresponding one of said tip or ring contacts of said output or input carrier sockets and each of said second set of four contacts of said connector card being electrically connected through said cable to a corresponding one of said tip or ring contacts of said output or input multiplexer sockets, whereby a high density digital signal cross-connect panel with a set of output and input multiplexer sockets and carrier sockets used to test and access a plurality of cross-connected multiplexer and carrier equipment circuits.

2. The panel of claim 1, wherein said connector sockets and said connector card are keyed to permit full insertion of said connector card into said selected connector socket only if said first and second sets of four contacts of said connector card are properly aligned with said first and second sets of four contacts of said selected connector socket.

3. The panel of claim 1, further including a first connector member mounted to said panel, and wherein said cable has its end remote from said connector card terminating in a second connector member which mates with said first connector member, said first and second connector members being releasably locked together, whereby the user cannot accidentally disconnect said cable from the panel and then unintentionally interrupting the corresponding multiplexer or carrier equipment circuits when said connector card is inserted into said selected connector socket without said first and second connector members being connected together.

4. The panel of claim 1, wherein said input and output multiplexer and carrier sockets are individually removable sockets which are each separately removable and replaceable by the user without interrupting operation of the other input or output multiplexer or carrier sockets or the multiplexer or carrier equipment circuits connected to said other multiplexer or carrier sockets.

5. The panel of claim 1, wherein said edge connector sockets are individually removable sockets which are each separately removable and replaceable by the user without interrupting operation of the other edge connector sockets or the multiplexer or carrier equipment circuits connected to said other edge connector sockets.

6. A telecommunications digital signal cross-connect panel for interfacing multiplexer equipment having at least N telecommunication circuits, each multiplexer circuit including an input tip and ring circuit and an output tip and ring circuit, and carrier equipment having at least N telecommunication circuits, each carrier circuit including an input tip and ring circuit and an output tip and ring circuit, where N equals at least 28, comprising:

at least N multiplexer rear ports mounted on a rear portion of the panel, each multiplexer rear port including input tip and ring terminals and output tip and ring terminals for connection of corresponding ones of the multiplexer equipment circuits thereto by a user of the panel;

at least N carrier rear ports mounted on said rear portion of the panel, each carrier rear port including input tip and ring terminals and output tip and ring terminals for connection of corresponding ones of the carrier equipment circuits thereto by the user;

at least N multiplexer cross-connect ports mounted on a front portion of the panel, each multiplexer cross-connect port including input tip and ring terminals and output tip and ring terminals, and at least N carrier cross-connect ports mounted on said front portion of the panel, each carrier cross-connect port including input tip and ring terminals and output tip and ring terminals to allow the user to selectively cross-connect ones of said multiplexer cross-connect ports to ones of said carrier cross-connect ports, as desired, so as to interconnect said multiplexer equipment circuits with said carrier equipment circuits for normal telecommunication operation, each of said four terminals of said carrier cross-connect ports being electrically connected internal of the panel to a corresponding one of said four terminals of a corresponding one of said carrier rear ports;

at least N edge connector sockets mounted on said front portion of the panel, each of said connector sockets having first and second sets of four contacts, each of said four contacts of said first set being electrically connected internal of the panel to a corresponding one of said four terminals of a corresponding one of said multiplexer cross-connect ports and each of said four contacts of said second set being electrically connected internal of the panel to a corresponding one of said four terminals of a corresponding one of said multiplexer rear ports, corresponding ones of said first set of four contacts and said second set of four contacts being in electrical contact when in a first state, and being out of electrical contact when in a second state;

at least two sets of test access sockets, each socket set including an input multiplexer test access socket, an output multiplexer test access socket, an input carrier test access socket, and an output carrier test access socket mounted on said front portion of the panel which allow the user to selectively insert test access plugs therein, each socket having a tip contact and a ring contact, said tip and ring contacts of said output multiplexer test socket and said tip and ring contacts of said input carrier test socket, respectively, for each of said socket sets being in electrical contact when no test plug is inserted into either of said output multiplexer test socket or said input carrier test socket, and being out of electrical contact when a test plug is inserted into either of said output multiplexer test socket or said input carrier test socket, and said tip and ring contacts of said input multiplexer test socket and said tip and ring contacts of said output carrier test socket, respectively, for each of said socket sets being in electrical contact when no test plug is inserted into either of said input multiplexer test socket or said output carrier test socket, and being out of electrical contact when a test plug is inserted into either of said input multiplexer test socket or said output carrier test socket;

at least two edge connector cards, each connector card being selectively insertable by the user into individual ones of said connector sockets and having first and second sets of four contacts, said first and second sets being located on opposite sides of said connector card with said four contacts of said first set of said connector card being positioned to be in electrical contact with corresponding ones of said four contacts of said first set of said connector socket and said four contacts of said second set of said connector card being positioned to be in electrical contact with corresponding ones of said four contacts of said second set of said connector socket when said connector card is inserted into said selected connector socket, said first and second sets of four contacts of said selected connector socket moving into said second state upon insertion of one of said connector cards into said selected connector socket and moving into said first state upon withdrawal of said connector card from said selected connector socket, said first and second sets of four contacts of said connector card making electrical contact with said first and second sets of four contacts of said selected connector socket upon insertion of said connector card into said selected connector socket before said selected connector socket moves into said second state, each of said connector cards having a cable electrically connecting said connector card to one of said socket sets with each of said first set of four contacts of said connector card electrically connected through said cable to a corresponding one of said tip or ring contacts of said output or input carrier test sockets and each of said second set of four contacts of said connector card being electrically connected through said cable to a corresponding one of said tip or ring contacts of said output or input multiplexer test sockets, whereby a high density digital signal cross-connect panel is provided with test socket sets which are each used to test and access a plurality of cross-connected multiplexer and carrier equipment circuits.

7. A telecommunications digital signal cross-connect system for interfacing a first telecommunication unit having at least N telecommunication circuits, each circuit including an input circuit and an output circuit, and a second telecommunication unit having at least N telecommunication circuits, each circuit including an input circuit and an output circuit, where N equals at least 28, comprising:

at least N first interface ports, each first interface port including input terminals and output terminals for connection of corresponding ones of the first telecommunication unit circuits thereto by a user of the panel;

at least N second interface ports, each second interface port including input terminals and output terminals for connection of corresponding ones of the second telecommunication unit circuits thereto by the user;

at least N first cross-connect ports, each first cross-connect port including input terminals and output terminals;

at least N second cross-connect ports, each second cross-connect port including input terminals and output terminals, each of said terminals of said second cross-connect ports being electrically connected to a corresponding one of said terminals of a corresponding one of said second interface ports, said first and second cross-connect ports allowing the user to selectively cross-connect ones of said first cross-connect ports to ones of said second cross-connect ports, as desired, so as to interconnect said first telecommunication unit circuits with said second telecommunication unit circuits for normal telecommunication operation;

at least N edge connector sockets, each connector socket having first and second sets of contacts, each of said contacts of said first set being electrically connected to a corresponding one of said terminals of a corresponding one of said first cross-connect ports and each of said contacts of said second set being electrically connected to a corresponding one of said terminals of a corresponding one of said first interface ports, corresponding ones of said first set of contacts and said second set of contacts being in electrical contact when in a first state, and being out of electrical contact when in a second state;

an input first test access socket, an output first test access socket, an input second test access socket, and an output second test access socket which allow the user to selectively insert test access plugs therein, each socket having contacts, said output first socket contacts and said input second socket contacts being in electrical contact when no test plug is inserted into either of said output first socket or said input second socket, and being out of electrical contact when a test plug is inserted into either of said output first socket or said input second socket, and said input first socket contacts and said output second socket contacts being in electrical contact when no test plug is inserted into either of said input first socket or said output second socket, and being out of electrical contact when a test plug is inserted into either of said input first socket or said output second socket;

an edge connector card selectively insertable by the user into individual ones of said connector sockets, said connector card having first and second sets of contacts, said contacts of said first set of said connector card being positioned to be in electrical contact with corresponding ones of said contacts of said first set of said connector socket and said contacts of said second set of said connector card being positioned to be in electrical contact with corresponding ones of said contacts of said second set of said connector socket when said connector card is inserted into said selected connector socket, said first and second sets of contacts of said selected connector socket moving into said second state upon insertion of said connector card into said selected connector socket and moving into said first state upon withdrawal of said connector card from said selected connector socket, said first and second sets of contacts of said connector card making electrical contact with said first and second sets of contacts of said selected connector socket upon insertion of said connector card into said selected connector socket before said selected connector socket moves into said second state, each of said first set of contacts of said connector card being electrically connected through a cable to a corresponding one of said contacts of said output or input second sockets and each of said second set of contacts of said connector card being electrically connected through said cable to a corresponding one of said contacts of said output or input first sockets.

8. The system of claim 7, wherein said connector sockets and said connector card are keyed to permit full insertion of said connector card into said selected connector socket only if said first and second sets of contacts of said connector card are properly aligned with said first and second sets of contacts of said selected connector socket.

9. The system of claim 7, further including a first connector member, and wherein said cable has its end remote from said connector card terminating in a second connector member which mates with said first connector member, said first and second connector members being releasably locked together, whereby the user cannot accidentally disconnect said cable from the system and then unintentionally interrupting the corresponding first or second telecommunication unit circuits when said connector card is inserted into said selected connector socket without said first and second connector members being connected together.

10. The system of claim 7, wherein said input and output first and second test access sockets are individually removable sockets which are each separately removable and replaceable by the user without interrupting operation of the other input or output first or second sockets or the first or second telecommunication unit circuits connected to said other first or second sockets.

11. The system of claim 7, wherein said edge connector sockets are individually removable sockets which are each separately removable and replaceable by the user without interrupting operation of the other edge connector sockets or the first or second telecommunication unit circuits connected to said other edge connector sockets.

12. A telecommunications digital signal cross-connect system for interfacing a first telecommunication unit having at least N telecommunication circuits, each circuit including an input circuit and an output circuit, and a second telecommunication unit having at least N telecommunication circuits, each circuit including an input circuit and an output circuit, where N equals at least 28, comprising:
  at least N first interface ports, each first interface port including input terminals and output terminals for connection of corresponding ones of the first telecommunication unit circuits thereto by a user of the panel;
  at least N second interface ports, each second interface port including input terminals and output terminals for connection of corresponding ones of the second telecommunication unit circuits thereto by the user;
  at least N first cross-connect ports, each first cross-connect port including input terminals and output terminals;
  at least N second cross-connect ports, each second cross-connect port including input terminals and output terminals, each of said terminals of said second cross-connect ports being electrically connected to a corresponding one of said terminals of a corresponding one of said second interface ports, said first and second cross-connect ports allowing the user to selectively cross-connect ones of said first cross-connect ports to ones of said second cross-connect ports, as desired, so as to interconnect said first telecommunication unit circuits with said second telecommunication unit circuits for normal telecommunication operation;
  at least N edge connector sockets, each connector socket having first and second sets of contacts, each of said contacts of said first set being electrically connected to a corresponding one of said terminals of a corresponding one of said first cross-connect ports and each of said contacts of said second set being electrically connected to a corresponding one of said terminals of a corresponding one of said first interface ports, corresponding ones of said first set of contacts and said second set of contacts being in electrical contact when in a first state, and being out of electrical contact when in a second state;
  at least two sets of test access sockets, each socket set including an input first test access socket, an output first test access socket, an input second test access socket and an output second test access socket which allow the user to selectively insert test access plugs therein, each socket having contacts, said output first socket contacts and said input second socket contacts for each of said socket sets being in electrical contact when no test plug is inserted into either of said output first socket or said input second socket, and being out of electrical contact when a test plug is inserted into either of said output first socket or said input second socket, and said input first socket contacts and said tip and ring contacts of said output second socket contacts for each of said socket sets being in electrical contact when no test plug is inserted into either of said input first socket or said output second socket, and being out of electrical contact when a test plug is inserted into either of said input first socket or said output second socket;
  at least two edge connector cards, each connector card being selectively insertable by the user into individual ones of said connector sockets and having first and second sets of contacts, said contacts of said first set of said connector card being positioned to be in electrical contact with corresponding ones of said contacts of said first set of said connector socket and said contacts of said second set of said connector card being positioned to be in electrical contact with corresponding ones of said contacts of said second set of said connector socket when said connector card is inserted into said selected connector socket, said first and second sets of contacts of said selected connector socket moving into said second state upon insertion of one of said connector cards into said selected connector socket and moving into said first state upon withdrawal of said connector card from said selected connector socket, said first and second sets of contacts of said connector card making electrical contact with said first and second sets of contacts of said selected connector socket upon insertion of said connector card into said selected connector socket before said selected connector socket moves into said second state, each of said connector cards having a cable electrically connecting said connector card to one of said socket sets with each of said first set of contacts of said connector card electrically connected through said cable to a corresponding one of said contacts of said output or input second sockets and each of said second set of contacts of said connector card being electrically connected through said cable to a corresponding one of said contacts of said output or input first sockets.

13. A telecommunications digital signal cross-connect system for interfacing a first telecommunication unit having at least N telecommunication circuits, each circuit including an input circuit and an output circuit, and a second telecommunication unit having at least N telecommunication circuits, each circuit including an input circuit and an output circuit, where N equals at least 2, comprising:
  at least N first interface ports, each first interface port including input terminals and output terminals for connection of corresponding ones of the first telecommunication unit circuits thereto by a user of the panel;
  at least N second interface ports, each second interface port including input terminals and output terminals for connection of corresponding ones of the second telecommunication unit circuits thereto by the user;

at least N first cross-connect ports, each first cross-connect port including input terminals and output terminals;

at least N second cross-connect ports, each second cross-connect port including input terminals and output terminals, each of said terminals of said second cross-connect ports being electrically connected to a corresponding one of said terminals of a corresponding one of said second interface ports, said first and second cross-connect ports allowing the user to selectively cross-connect ones of said first cross-connect ports to ones of said second cross-connect ports, as desired, so as to interconnect said first telecommunication unit circuits with said second telecommunication unit circuits for normal telecommunication operation;

at least N edge connector sockets, each connector socket having first and second sets of contacts, each of said contacts of said first set being electrically connected to a corresponding one of said terminals of a corresponding one of said first cross-connect ports and each of said contacts of said second set being electrically connected to a corresponding one of said terminals of a corresponding one of said first interface ports, corresponding ones of said first set of contacts and said second set of contacts being in electrical contact when in a first state, and being out of electrical contact when in a second state;

an input first test access socket, an output first test access socket, an input second test access socket, and an output second test access socket which allow the user to selectively insert test access plugs therein, each socket having contacts;

an edge connector card selectively insertable by the user into individual ones of said connector sockets, said connector card having first and second sets of contacts, said contacts of said first set of said connector card being positioned to be in electrical contact with corresponding ones of said contacts of said first set of said connector socket and said contacts of said second set of said connector card being positioned to be in electrical contact with corresponding ones of aid contacts of said second set of said connector socket when said connector card is inserted into said selected connector socket, said first and second sets of contacts of said selected connector socket moving into said second state upon insertion of said connector card into said selected connector socket and moving into said first state upon withdrawal of said connector card from said selected connector socket, said first and second sets of contacts of said connector card making electrical contact with said first and second sets of contacts of said selected connector socket upon insertion of said connector card into said selected connector socket before aid selected connector socket moves into said second state, each of said first set of contacts of said connector card being electrically connected through a cable to a corresponding one of said contacts of said output or input second sockets and each of said second set of contacts of said connector card being electrically connected through said cable to a corresponding one of said contacts of said output or input first sockets.

14. A telecommunications digital signal cross-connect system for interfacing a first telecommunication unit having at least N telecommunication circuits, each circuit including an input circuit and an output circuit, and a second telecommunication unit having at least N telecommunication circuits, each circuit including an input circuit and an output circuit, where N equals at least 2, comprising:

at least N first interface ports, each first interface port including input terminals and output terminals for connection of corresponding ones of the first telecommunication unit circuits thereto by a user of the panel;

at least N second interface ports, each second interface port including input terminals and output terminals for connection of corresponding ones of the second telecommunication unit circuits thereto by the user;

at least N first cross-connect ports, each first cross-connect port including input terminals and output terminals;

at least N second cross-connect ports, each second cross-connect port including input terminals and output terminals, each of said terminals of said second cross-connect ports being electrically connected to a corresponding one of said terminals of a corresponding one of said second interface ports, said first and second cross-connect ports allowing the user to selectively cross-connect ones of said first cross-connect ports to ones of said second cross-connect ports, as desired, so as to interconnect said first telecommunication unit circuits with said second telecommunication unit circuits for normal telecommunication operation;

at least N edge connector sockets, each connector socket having first and second sets of contacts, each of said contacts of said first set being electrically connected to a corresponding one of said terminals of a corresponding one of said first cross-connect ports and each of said contacts of said second set being electrically connected to a corresponding one of said terminals of a corresponding one of said first interface ports, corresponding ones of said first set of contacts and said second set of contacts being in electrical contact when in a first state, and being out of electrical contact when in a second state;

at least two sets of test access sockets, each socket set including an input first test access socket, an output first test access socket, an input second test access socket, and an output second test access socket which allow the user to selectively insert test access plugs therein, each socket having contacts;

at least two edge connector cards, each connector card being selectively insertable by the user into individual ones of said connector sockets and having first and second sets of contacts, said contacts of said first set of said connector card being positioned to be in electrical contact with corresponding ones of said contacts of said first set of said connector card being positioned to be in electrical contact with corresponding ones of said contacts of said second set of said connector socket when said connector card is inserted into said selected connector socket, said first and second sets of contacts of said selected connector socket moving into said second state upon insertion of one of said connector cards into said selected connector socket and moving into said first state upon withdrawal of said connector card from said selected connector socket, said first and second sets of contacts of said connector card making electrical contact with said first and second sets of contacts of said selected connector socket upon insertion of said connector card into said selected connector socket before said selected connector socket moves into said second state, each of said connector cards having a cable electrically connecting said connector card to one of said socket sets with each of said first set of contacts of said connector card electrically connected through said cable to a corresponding one of said contacts of said output or input second sockets and each of said second set of contacts of said connector card being electrically connected through said cable to a corresponding one of said contacts of said output or input first sockets.

15. A telecommunications digital signal cross-connect system for interfacing a first telecommunication unit having at least N telecommunication circuits, each circuit including an input circuit and an output circuit, and a second telecommunication unit having at least N telecommunication circuits, each circuit including an input circuit and an output circuit, where N equals at least 2, comprising:

at least N first interface ports, each first interface port including input terminals and output terminals for connection of corresponding ones of the first telecommunication unit circuits thereto by a user of the panel;

at least N second interface ports, each second interface port including input terminals and output terminals for connection of corresponding ones of the second telecommunication unit circuits thereto by the user;

at least N first cross-connect ports, each first cross-connect port including input terminals and output terminals;

at least N second cross-connect ports, each second cross-connect port including input terminals and output terminals, each of said terminals of said second cross-connect ports being electrically connected to a corresponding one of said terminals of a corresponding one of said second interface ports, said first and second cross-connect ports allowing the user to selectively cross-connect ones of said first cross-connect ports to ones of said second cross-connect ports, as desired, so as to interconnect said first telecommunication unit circuits with said second telecommunication unit circuits for normal telecommunication operation;

at least N panel connector members, each panel connector member having first and second sets of contacts, each of said contacts of said first set being electrically connected to a corresponding one of said terminals of a corresponding one of said first cross-connect ports and each of said contacts of said second set being electrically connected to a corresponding one of said terminals of a corresponding one of said first interface ports, corresponding ones of said first set of contacts and said second set of contacts being in electrical contact when in a first state, and being out of electrical contact when in a second state;

an input first test access connector member, an output first test access connector member, an input second test access connector member, and an output second test access connector member which allow the user to selectively connect test access mating connector members thereto, each first and second connector member having contacts, said output first connector member contacts and said input second connector member contacts being in electrical contact when no mating test connector member is connected to either of said output first connector member or said input second connector member, and being out of electrical contact when a mating test connector member is connected to either of said output first connector member or said input second connector member, and said input first connector member contacts and said output second connector member contacts being in electrical contact when no mating test connector member is connected to either of said input first connector member or said output second connector member, and being out of electrical contact when a mating test connector member is connected to either of said input first connector member or said output second connector member;

a movable connector member selectively connectable by the user to individual ones of said panel connector members, said movable connector member having first and second sets of contacts, said contacts of said first set of said movable connector member being positioned to be in electrical contact with corresponding ones of said contacts of said first set of said panel connector member and said contacts of said second set of said movable connector member being positioned to be in electrical contact with corresponding ones of said contacts of said second set of said panel connector member when said movable connector member is connected to said selected panel connector member, said first and second sets of contacts of said selected panel connector member moving into said second state upon connection of said movable connector member to said selected panel connector member and moving into said first state upon disconnection of said movable connector member from said selected panel connector member, each of said first set of contacts of said movable connector member being electrically connected through a cable to a corresponding one of said contacts of said output or input second connector members and each of said second set of contacts of said movable connector member being electrically connected through said cable to a corresponding one of said contacts of said output or input first connector members.

16. A telecommunications digital signal cross-connect system for interfacing a first telecommunication unit having at least N telecommunication circuits, each circuit including an input circuit and an output circuit, and a second telecommunication unit having at least N telecommunication circuits, each circuit including an input circuit and an output circuit, where N equals at least 2, comprising:

at least N first interface ports, each first interface port including input terminals and output terminals for connection of corresponding ones of the first telecommunication unit circuits thereto by a user of the panel;

at least N second interface ports, each second interface port including input terminals and output terminals for connection of corresponding ones of the second telecommunication unit circuits thereto by the user;

at least N first cross-connect ports, each first cross-connect port including input terminals and output terminals;

at least N second cross-connect ports, each second cross-connect port including input terminals and output terminals, each of said terminals of said second cross-connect ports being electrically connected to a corresponding one of said terminals of a corresponding one of said second interface ports, said first and second cross-connect ports allowing the user to selectively cross-connect ones of said first cross-connect ports to ones of said second cross-connect ports, as desired, so as to interconnect said first telecommunication unit circuits with said second telecommunication unit circuits for normal telecommunication operation;

at least N panel connector members, each panel connector member having first and second sets of contacts, each of said contacts of said first set being electrically connected to a corresponding one of said terminals of a corresponding one of said first cross-connect ports and each of said contacts of said second set being electrically connected to a corresponding one of said terminals of a corresponding one of said first interface ports, corresponding ones of said first set of contacts and said second set of contacts being in electrical contact when in a first state, and being out of electrical contact when in a second state;

at least two sets of test access connector members, each test access connector member set including an input first test access connector member, an output first test access connector member, an input second test access connector member, and an output second test access connector member which allow the user to selectively connect test access mating connector members thereto, each first and second connector member having contacts, said output first connector member contacts and said input second connector member contacts for each of said test access connector member sets being in electrical contact when no mating test connector member is connected to either of said output first connector member or said input second connector member, and being out of electrical contact when a mating test connector member is connected to either of said output first connector member or said input second connector member, and said input first connector member contacts and said output second connector member contacts for each of said test access connector member sets being in electrical contact when no mating test connector member is connected to either of said input first connector member or said output second connector member, and being out of electrical contact when a mating test connector member is connected to either of said input first connector member or said output second connector member;

at least two movable connector members, each movable connector member being selectively connectable by the user to individual ones of said panel connector members and having first and second sets of contacts, said contacts of said first set of said movable connector member being positioned to be in electrical contact with corresponding ones of said contacts of said first set of said panel connector member and said contacts of said second set of said movable connector member being positioned to be in electrical contact with corresponding ones of said contacts of said second set of said panel connector member when said movable connector member is connected to said selected panel connector member, said first and second sets of contacts of said selected panel connector member moving into said second state upon connection of one of said movable connector members to said selected panel connector member and moving into said first state upon disconnection of said movable connector member from said selected panel connector member, each of said movable connector members having a cable electrically connecting said movable connector member to one of said test access connector member sets with each of said first set of contacts of said movable connector member electrically connected through said cable to a corresponding one of said contacts of said output or input second connector members and each of said second set of contacts of said movable connector member being electrically connected through said cable to a corresponding one of said contacts of said output or input first connector members.

17. A telecommunications digital signal cross-connect system for interfacing a first telecommunication unit having at least N telecommunication circuits, each circuit including an input circuit and an output circuit, and a second telecommunication unit having at least N telecommunication circuits, each circuit including an input circuit and an output circuit, where N equals at least 2, comprising:

at least N first interface ports, each first interface port including input terminals and output terminals for connection of corresponding ones of the first telecommunication unit circuits thereto by a user of the panel;

at least N second interface ports, each second interface port including input terminals and output terminals for connection of corresponding ones of the second telecommunication unit circuits thereto by the user;

at least N first cross-connect ports, each first cross-connect port including input terminals and output terminals;

at least N second cross-connect ports, each second cross-connect port including input terminals and output terminals, each of said terminals of said second cross-connect ports being electrically connected to a corresponding one of said terminals of a corresponding one of said second interface ports, said first and second cross-connect ports allowing the user to selectively cross-connect ones ofs aid first cross-connect ports to ones of said second cross-connect ports, as desired, so as to interconnect said first telecommunication unit circuits with said second telecommunication unit circuits for normal telecommunication operation;

at least N panel connector members, each panel connector member having first and second sets of contacts, each of said contacts of said first set being electrically connected to a corresponding one of said terminals of a corresponding one of said first cross-connect ports and each of said contacts of said second set being electrically connected to a corresponding one of said terminals of a corresponding one of said first interface ports, corresponding ones of said first set of contacts and said second set of contacts being in electrical contact when in a first state, and being out of electrical contact when in a second state;

an input first test access connector member, an output first test access connector member, an input second test access connector member, and an output second test access connector member which allow the user to selectively connect test access mating connector members thereto, each first and second connector member having contacts;

a movable connector member selectively connectable by the user to individual ones of said panel connector members, said movable connector member having first and second sets of contacts, said contacts of said first set of said movable connector member being positioned to be in electrical contact with corresponding ones of said contacts of said first set of said panel connector member and said contacts of said second set of said movable connector member being positioned to be in electrical contact with corresponding ones of said contacts of said second set of said panel connector member when said movable connector member is connected to said selected panel connector member, said first and second sets of contacts of said selected panel connector member moving into said second state upon connection of said movable connector member to said selected panel connector member and moving into said first state upon disconnection of said movable connector member from said selected panel connector member, each of said first set of contacts of said movable connector member being electrically connected through a cable to a corresponding one of said contacts of said output or input second connector members and each of said second set of contacts of said movable connector member being electrically connected through said cable to a corresponding one of said contacts of said output or input first connector members.

18. The system of claim 17, wherein said panel connector members and said movable connector member are keyed to permit full insertion of said movable connector member into said selected panel connector member only if said first and second sets of contacts of said movable connector member are properly aligned with said first and second sets of contacts of said selected panel connector member.

19. The system of claim 17, further including a first connector member, and wherein said cable has its end remote from said movable connector member terminating in a second connector member which mates with said first connector member, said first and second connector members being releasably locked together, whereby the user cannot accidentally disconnect said cable and then unintentionally interrupting the corresponding first or second telecommunication unit circuits when said movable connector member is inserted into said selected panel connector member without said first and second connector members being connected together.

20. The system of claim 17, wherein said input and output first and second test access connector members are individually removable and are each separately removable and replaceable by the user without interrupting operation of the other input or output first or second test access connector members or the first or second telecommunication unit circuits connected to said other first or second test access connector members.

21. The system of claim 17, wherein said panel connector members are individually removable and are each separately removable and replaceable by the user without interrupting operation of the other panel connector members or the first or second telecommunication unit circuits connected to said other panel connector members.

22. A telecommunications digital signal cross-connect system for interfacing a first telecommunication unit having at least N telecommunication circuits, each circuit including an input circuit and an output circuit, and a second telecommunication unit having at least N telecommunication circuits, each circuit including an input circuit and an output circuit, where N equals at least 2, comprising:

at least N first interface ports, each first interface port including input terminals and output terminals for connection of corresponding ones of the first telecommunication unit circuits thereto by a user of the panel;

at least N second interface ports, each second interface port including input terminals and output terminals for connection of corresponding ones of the second telecommunication unit circuits thereto by the user;

at least N first cross-connect ports, each first cross-connect port including input terminals and output terminals;

at least N second cross-connect ports, each second cross-connect port including input terminals and output terminals, each of said terminals of said second cross-connect ports being electrically connected to a corresponding one of said terminals of a corresponding one of said second interface ports, said first and second cross-connect ports allowing the user to selectively cross-connect ones of said first cross-connect ports to ones of said second cross-connect ports, as desired, so as to interconnect said first telecommunication unit circuits with said second telecommunication unit circuits for normal telecommunication operation;

at least N panel connector members, each panel connector member having first and second sets of contacts, each of said contacts of said first set being electrically connected to a corresponding one of said terminals of a corresponding one of said first cross-connect ports and each of said contacts of said second set being electrically connected to a corresponding one of said terminals of a corresponding one of said first interface ports, corresponding ones of said first set of contacts and said second set of contacts being in electrical contact when in a first state, and being out of electrical contact when in a second state;

at least two sets of test access connector members, each test access connector member set including an input first test access connector member, an output first test access connector member, an input second test access connector member, and an output second test access connector member which allow the user to selectively connect test access mating connector members thereto, each first and second connector member having contacts;

at least two movable connector members, each movable connector member being selectively connectable by the user to individual ones of said panel connector members and having first and second sets of contacts, said contacts of said first set of said movable connector member being positioned to be in electrical contact with corresponding ones of said contacts of said first set of said panel connector member and said contacts of said second set of said movable connector member being positioned to be in electrical contact with corresponding ones of said contacts of said second set of said panel connector member when said movable connector member is connected to said selected panel connector member, said first and second sets of contacts of said selected panel connector member moving into said second state upon connection of one of said movable connector members to said selected panel connect member and moving into said first state upon disconnection of said movable connector member from said selected panel connector member, each of said movable connector members having a cable electrically connecting said movable connector member to one of said test access connector member sets with each of said first set of contacts of said movable connector member electrically connected through said cable to a corresponding one of said contacts of said output or input second connector members and each of said second set of contacts of said movable connector member being electrically connected through said cable to a corresponding one of said contacts of said output or input first connector members.

* * * * *